United States Patent Office 2,907,766
Patented Oct. 6, 1959

2,907,766
PIPERAZINE DERIVATIVES

Arthur W. Weston, Waukegan, Harold E. Zaugg, Lake Forest, and Raymond J. Michaels, Jr., Mundelein, Ill., assignors to Abbott Laboratories, North Chicago, Ill., a corporation of Illinois No Drawing. Application September 10, 1956
Serial No. 608,690

3 Claims. (Cl. 260—268)

The present invention relates to a mono-substituted piperazine compound having improved therapeutic properties and more particularly to mono-substituted hydroxyalkyl piperazine compounds and to the method of making said compounds.

The novel substituted piperazine base of the present invention has the general formula:

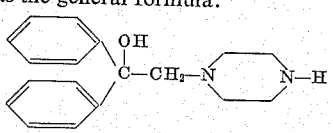

The following specific examples are for the purpose of illustrating the present invention and should not be considered as limiting the said invention to the particular ingredients or proportions disclosed.

EXAMPLE I

N-(β,β-diphenyl-β-hydroxyethyl)piperazine a. *N-benzyl-piperazine-N'-acetic acid ethyl ester.*—N-benzyl-piperazine-N'-acetic acid ethyl ester is prepared by mixing 51.7 gms. benzyl piperazine, 36.8 gms. ethyl chloroacetate, 51.4 gms. anhydrous sodium bicarbonate and 300 cc. of ethyl alcohol and refluxing the reaction mixture for 16 hours. The cooled reaction mixture is filtered and the alcohol filtrate is concentrated under reduced pressure to dryness on a steam bath.

b. *N - (β,β - diphenyl - β - hydroxyethyl) - N' - benzyl-piperazine.*—In a 2-liter, 3-necked, round-bottomed flask equipped with a stirrer, dropping funnel and a condenser protected with a calcium chloride drying tube is placed 25.3 gms. of magnesium turnings and the turnings are covered with anhydrous ether. A crystal of iodine is added to the flask and 165.2 gms. of bromobenzene dissolved in 250 cc. of dry ether is added dropwise with stirring. The reaction mixture is stirred while heating on a steam bath for about 2 hours after the addition of the bromobenzene solution is completed to give the Grignard reagent, phenyl magnesium bromide. The ether solvent is then distilled and replaced with 200 cc. of dry benzene. Thereafter 69 gms. of N-benzyl-N'-piperazine acetic acid ethyl ester dissolved in 100 cc. of dry benzene is added dropwise to the benzene solution of phenyl magnesium bromide and refluxed for 16 hours. The reaction mixture is cooled and a solution of 100 gms. of ammonium chloride dissolved in 100 cc. of water is added dropwise with stirring. The mixture is then filtered to remove the magnesium salts. The ether portion is separated from the aqueous layer and then concentrated to dryness on a steam bath. Benzene is added to remove any water which may be present. Upon cooling, the product solidifies and on recrystallizing from ether-alcohol exhibits a melting point of 177–119° C.

c. *N - (β,β - diphenyl - β - hydroxyethyl)piperazine.*—A solution of 18.6 gms. of N-(β,β-diphenyl-β-hydroxyethyl)-N'-benzylpiperazine, 100 cc. of ethyl alcohol containing 0.1 mol of hydrogen chloride, 100 cc. of water and 2.0 gms. of 5% palladium on charcoal is hydrogenated at a pressure of 24 pounds for a period of 2 hours. The reaction mixture is filtered and the filtrate concentrated to dryness under reduced pressure. The product, N-(β,β-diphenyl-β-hydroxyethyl) piperazine dihydrochloride on recrystallizing from 400 cc. of hot absolute ethyl alcohol yields a crystalline product having a melting point of 260° C. After drying the said dihydrochloride at 130° C. under reduced pressure, the said salt was found to have on chemical analysis 61.01% C, 6.54% H and 4.3% O.

The free base N-(β,β-diphenyl-β-hydroxyethyl)piperazine is obtained by adding sodium hydroxide to a portion of the said dihydrochloride salt until basic, and the base is recrystallized from cyclohexene. The said base exhibits a melting point of 138–139° C. and does not depress the melting point of a known sample of the said base.

EXAMPLE II

N-(β,β-diphenyl-β-hydroxyethyl)piperazine

The compound, N-(β,β-diphenyl-β-hydroxyethyl)piperazine, is also prepared by heating on a steam bath for 20 hours a mixture of 5.6 gms. of 1,1-diphenylethylene oxide and 7.4 gms. of anhydrous piperazine to which is added 4 drops of water. The solid mixture, after heating for a short period, liquifies and then resolidifies. Water is added to the cooled reaction mixture, which is then warmed gently on a steam bath. The mixture is filtered while warm and the solid product is dissolved in ethyl alcohol. Thereafter water is added to the alcohol solution until turbidity develops and an oil layer separates and then solidifies. The solid product, N-(β,β-diphenyl-β-hydroxyethyl) piperazine after recrystallizing from ethyl alcohol exhibits a melting point of 135–136° C. On chemical analysis, the said product is found to contain 76.61% C, 7.60% H, and 9.80% N, as compared with a theoretical composition of 76.56% C, 7.85% H, and 9.92% N.

The acid addition salts of the compounds of the present invention are particularly useful for treating Parkinson's disease since the said compound produces mild euphoria in the patient and controls tremor. The compound can be administered in the form of 100, 200, and 300 mg. tablets as prescribed by a physician.

The compositions of the present invention are generally more conveniently administered therapeutically as non-toxic salts, including the acid addition salts, since these salts are usually more soluble in water than is the free base. Any acid which produces a water-soluble salt and does not appreciably enhance the toxicity is suitable for use, and such acids as sulfuric, phosphoric, hydrochloric, levulinic, mucic, acetic and tartaric acid can be used. The sparingly soluble salts, as well as the free bases, however, can be administered when the pharmacological effect desired should be slow and relatively long in duration.

Others may readily adapt the invention for use under various conditions of service by employing one or more of the novel features disclosed or equivalents thereof. As at present advised with respect to the apparent scope of our invention, we desire to claim the following subject matter.

We claim:
1. The compound N-(β,β-diphenyl-β-hydroxyethyl) piperazine.
2. The non-toxic acid addition salt of N-(β,β-diphenyl-β-hydroxyethyl)-piperazine.
3. The dihydrochloride salt of N-(β,β-diphenyl-β-hydroxyethyl)-piperazine.

References Cited in the file of this patent
UNITED STATES PATENTS
2,716,121   Denton _____ Aug. 23, 1955
FOREIGN PATENTS
683,950   Great Britain _____ Dec. 10, 1952

UNITED STATES PATENT OFFICE
CERTIFICATE OF CORRECTION

Patent No. 2,907,766                                        October 6, 1959

Arthur W. Weston et al

It is hereby certified that error appears in the printed specification of the above numbered patent requiring correction and that the said Letters Patent should read as corrected below.

Column 1, line 63, for "177-119° C." read -- 117-119° C. --.

Signed and sealed this 26th day of April 1960.

(SEAL)
Attest:

KARL H. AXLINE
Attesting Officer

ROBERT C. WATSON
Commissioner of Patents